US012809711B2

(12) United States Patent
Patel

(10) Patent No.: US 12,809,711 B2
(45) Date of Patent: Nov. 24, 2026

(54) DATA MANAGEMENT FOR ARTIFICIAL INTELLIGENCE WORKLOADS

(71) Applicant: Dell Products L.P., Round Rock, TX (US)

(72) Inventor: Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 19/036,324

(22) Filed: Jan. 24, 2025

(65) Prior Publication Data

US 2026/0219977 A1 Jul. 30, 2026

(51) Int. Cl.
*G06F 11/07* (2006.01)
*G06F 11/20* (2006.01)

(52) U.S. Cl.
CPC ........ *G06F 11/079* (2013.01); *G06F 11/0793* (2013.01); *G06F 11/203* (2013.01)

(58) Field of Classification Search
CPC ... G06F 11/079; G06F 11/0793; G06F 11/203
USPC .......................................................... 714/48
See application file for complete search history.

(56) References Cited

U.S. PATENT DOCUMENTS 11,429,862 B2 8/2022 Chai et al.
11,818,106 B2 11/2023 Doshi et al.
2006/0282527 A1* 12/2006 Chiou ................. H04L 41/0253 709/224
2022/0086035 A1* 3/2022 Devaraj .............. H04L 43/0835
2024/0311664 A1* 9/2024 Stanley .............. G06Q 10/0637
2025/0298974 A1* 9/2025 Peters ...................... G10L 15/26
2025/0355641 A1* 11/2025 Madden .................... G06F 8/10

OTHER PUBLICATIONS

NVIDIA. (n.d.). "NVIDIA AI Enterprise: Sizing Guide". Retrieved from <https://docs.nvidia.com/ai-enterprise/sizing-guide/latest/overview.html> on Jan. 28, 2025 (1 page).
Verghote et al. (Nov. 15, 2024). "Considerations for addressing the core dimensions of responsible AI for Amazon Bedrock applications". Amazon Web Services. AWS Machine Learning Blog. Retrieved from <https://aws.amazon.com/blogs/machine-learning/considerations-for-addressing-the-core-dimensions-of-responsible-ai-for-amazon-bedrock-applications/> on Jan. 28, 2025 (5 pages).
Amazon Web Services. (Aug. 28, 2024). "AWS Decision Guide—Choosing a generative AI service". Retrieved from <https://docs.aws.amazon.com/pdfs/decision-guides/latest/generative-ai-on-aws-how-to-choose/generative-ai-on-aws-how-to-choose.pdf#guide> on Jan. 28, 2025 (27 pages).

(Continued)

*Primary Examiner* — Yair Leibovich
(74) *Attorney, Agent, or Firm* — WOMBLE BOND DICKINSON (US) LLP

(57) ABSTRACT

Methods, systems, and devices are provided for managing operation of a system. To manage the system, operation of an artificial intelligence workflow pipeline may be monitored. If any components of the artificial intelligence workflow pipeline are identified as exhibiting unexpected behavior based on the monitoring, additional analysis may be performed to attempt to identify issues impacting the components. Remediations may then be performed to attempt to address the issues impacting the components.

20 Claims, 11 Drawing Sheets

(56) References Cited

OTHER PUBLICATIONS

Zachary-Cavanell. (Oct. 22, 2024). "How to Choose the Right Models for Your Apps | Azure AI". Microsoft. Retrieved from <https://techcommunity.microsoft.com/blog/microsoftmechanicsblog/how-to-choose-the-right-models-for-your-apps--azure-ai/4271216> on Jan. 28, 2025 (5 pages).
Microsoft. (Jan. 16, 2025). "AI Strategy—Process to develop an AI strategy". Retrieved from <https://learn.microsoft.com/en-us/azure/cloud-adoption-framework/scenarios/ai/strategy> on Jan. 28, 2025 (5 pages).
Storage Experts. (Oct. 15, 2021). Hewlett Packard. Retrieved from <https://community.hpe.com/t5/around-the- storage-block/optimal-workload-placement-using-the-ai-driven-hpe-infosight/ba-p/7151240> on Jan. 28, 2025 (5 pages).
Kshitish Purohit. (Aug. 27, 2024). "Optimising Multicloud Workload Placement with AI and Machine Learning". Apiculus. Retrieved from <https://www.apiculus.com/blog/optimising-multicloud-workload-placement-with-ai-and-machine-learning/> on Jan. 28, 2025 (3 pages).
McDermott et al. (Aug. 8, 2023). "Distilled Pruning: Using Synthetic Data to Win the Lottery". arXiv:2307.03364. Retrieved from <https://arxiv.org/pdf/2307.03364> on Jan. 28, 2025 (8 pages).
Ankner et a. (May 30, 2024). "Perplexed by Perplexity: Perplexity-Based Data Pruning With Small Reference Models". arXiv:2405.20541. Retrieved from <https://arxiv.org/pdf/2405.20541> on Jan. 28, 2025 (20 pages).

* cited by examiner

DATA MANAGEMENT FOR ARTIFICIAL INTELLIGENCE WORKLOADS

FIELD

Embodiments disclosed herein relate generally to management of data processing systems. More particularly, embodiments disclosed herein relate to systems and methods for management of artificial intelligence-based systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
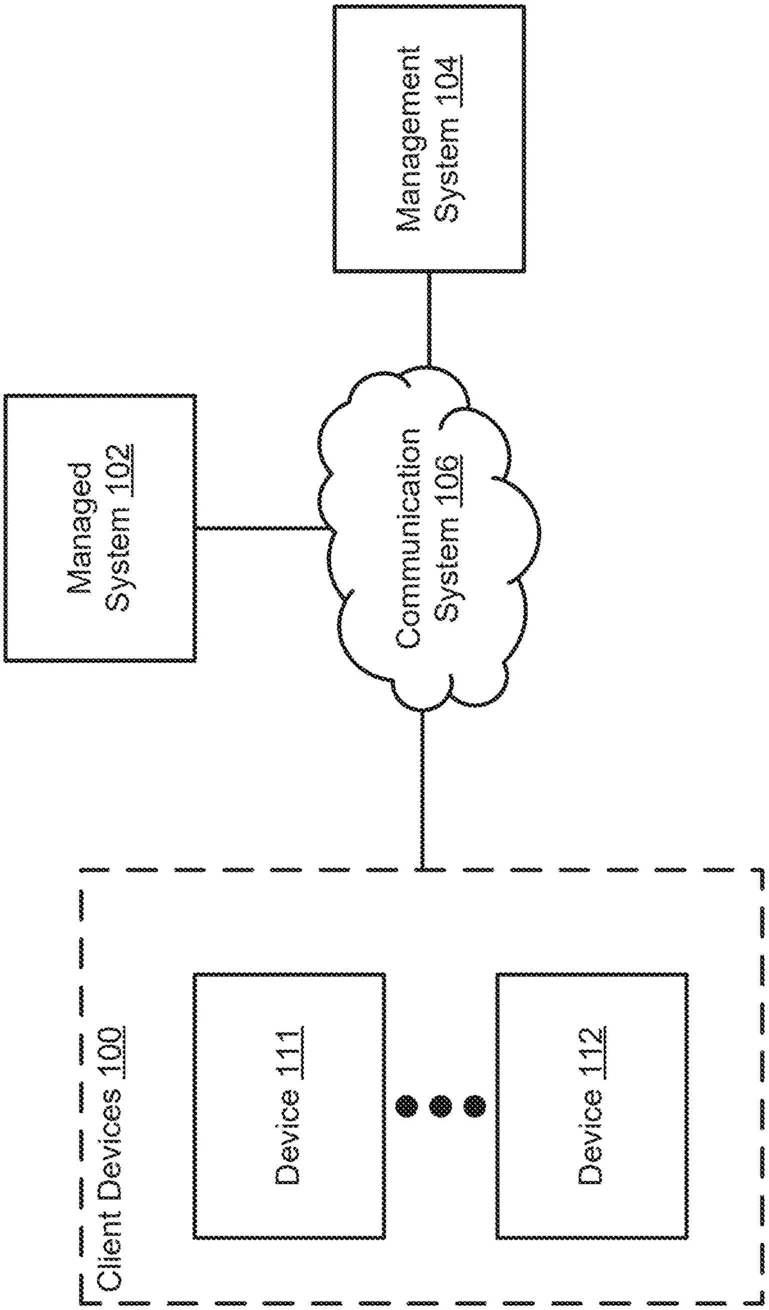
FIG. 1 shows a block diagram illustrating systems in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems that may provide, at least in part, computer implemented services. The computer implemented services may be provided to any type and/or number of other devices and/or users of the data processing systems. Furthermore, the provided computer implemented services may be of any quantity and/or type of such services.

As part of the computer implemented services, various artificial intelligence based services may be utilized. To enable artificial intelligence based services to be efficiently provided, potential hardware to support operation of an artificial intelligence based workflow architecture may be analyzed. During the analysis, potential communication bottlenecks may be proactively identified and used as a basis for disqualifying potential hardware.

Consequently, when deployed to selected hardware, the artificial intelligence based services may be less likely to suffer phantom slowdowns or other undesired behavior due to communication bottlenecks that may not be apparent from analysis of the hardware architecture. Accordingly, the disclosed systems may be more likely to provide desired services (e.g., that meet the expectations of users).

Once instantiated, operation of an artificial intelligence workflow pipeline may be monitored. In particular, queues or other parts that may indicate bottlenecking may be monitored. The operation of these components may be compared to historic operation of similar pipelines to identify whether the operation is anomalous, unexpected, undesired, etc. If so identified, then the components of the artificial intelligence workflow pipeline and host hardware may be analyzed to identify communication and/or storage access bottlenecks. If such bottlenecks are identified, a remediation plan may be generated and performed to update operation of the artificial intelligence workflow pipeline so that it is less likely to exhibit that behavior, and is more likely to provide desired computer implemented services.

In an embodiment, a method for managing operation of a distributed system is provided. The method may include identifying queue lengths associated with components of an artificial intelligence workflow pipeline that provides undesired computer implemented services and is hosted by the distributed system; filtering the queue lengths using a knowledge base to identify a portion of the components as suspect components; for a suspect component of the suspect components: identifying a root cause of a corresponding one of the queue lengths using, at least, information regarding communication capabilities of the suspect component with respect to other components of the components; identifying, based on the root cause, a remediation plan; performing the remediation plan to update operation of the artificial intelligence workflow pipeline to facilitate provisioning of desired computer implemented service.

The components of the artificial intelligence workflow pipeline may include a trained machine learning model; a prompt pre-processor; and a response processor.

When the root cause is a communication bottleneck between a query system of the prompt pre-processor and a data source used by the query system, the remediation plan may include at least one action selected from a list of actions consisting of: migrating the query system; migrating the data source; and replicating a new copy of the data source.

When the root cause is a communication bottleneck between a source of training data used to train the trained machine learning model and the trained machine learning model, the remediation plan may include at least one action selected from a list of actions consisting of: migrating the trained machine learning model; and migrating the source of training data.

When the root cause is a communication bottleneck between the prompt pre-processor and the trained machine learning model, the remediation plan may include at least one action selected from a list of actions consisting of: migrating the trained machine learning model; and migrating the prompt pre-processor.

When the root cause is a communication bottleneck between the response processor and a source of truth data source used by the response processor, the remediation plan may include at least one action selected from a list of actions consisting of: migrating the response processor; and migrating the source of truth data source.

The remediation plan may include at least one action selected from a list of actions consisting of: migrating at least one component of the artificial intelligence workflow pipeline between host hardware components of the distributed system; and adding new hardware components to the distributed system and migrating the at least one component of the artificial intelligence workflow pipeline from one of the host hardware components to one of the new hardware components.

Filtering the queue lengths may include for a queue associated with one of the queue lengths: identifying a historic processing rate of a component of the components that uses the queue; identifying rate at which requests for processing are enqueued in the queue; and determining whether the one of the queue lengths is unexpected based on the historic processing rate and the rate at which the requests for processing are enqueued in the queue; and in an instance of the determining where the one of the queue lengths is unexpected: adding the component of the components to the portion of the components.

The artificial intelligence workflow pipeline may include a trained generative machine learning model that is hosted by at least one special purpose hardware device, and a retrieval augmented generation component hosted by a processor that uses a data source stored in a storage device.

The suspect components may operate in a manner that is not commensurate with computing resources available for use by the suspect components.

In an embodiment, a non-transitory media is provided. The non-transitory media may include instructions that when executed by a processor cause, at least in part, any of the methods discussed above to be performed.

In an embodiment, a data processing system is provided. The data processing system may include the non-transitory media and a processor and may, at least in part, perform any of the methods discussed above when the computer instructions are executed by the processor.

Turning to FIG. 1, a block diagram illustrating a system in accordance with an embodiment is shown. The system shown in FIG. 1 may be a distributed system that provides computer implemented services.

These computer implemented services may include any type and/or quantity of services. The services may include, for example, database services, data processing services, electronic communication services, and/or any other services that may be provided by one or more computing devices. Other types of services may be provided by the system shown in FIG. 1 without departing from embodiments disclosed herein.

When providing these computer implemented services, other types of services (e.g., non-primary services) may be utilized (e.g., by primary services that provide the desired computer implemented services). For example, various artificial intelligence based services (e.g., non-primary services) may be used to provide the desired computer implemented services (e.g., by primary services). The artificial intelligence based services may be provided using, for example, trained machine learning models. The trained machine learning models may be trained to provide inferential, generative, and/or other types of artificial intelligence based services.

In the context of generative services, various prompts may be submitted and processed by the trained machine learning models to generate an output. Depending on the type of the generative services, various other supporting services such as retrieval augmented generation, transfer learning, distillation, reinforced learning, and/or other support services for artificial intelligence services may be used. Consequently, an artificial intelligence based processing architecture (e.g., trained machine learning model and other support services) may vary significantly depending on implementation.

To support operation of the artificial intelligence based processing architectures, various hardware resources may be allocated for use by these artificial intelligence based processing architectures. However, unlike many types of computing processes that may generally benefit from resource scaling (e.g., allocating additional computing resources via any mechanism such as parallelism via instantiating new instances of components of the artificial intelligence based processing architectures), artificial intelligence based processing architectures may present unique resource constraints that may result in unexpected behavior when resource scaling is employed. If the unique resource constraints (or other types of limits) are not met by the resources allocated to the artificial intelligence based processing architectures, then the additionally allocated resources may be used inefficiently and the artificial intelligence based processing architectures may provide poor quality of services. For example, various bottlenecks in the allocated resources may prevent the artificial intelligence based processing architectures from efficiently utilizing the allocated resources. Consequently, significant quantities of allocated resources may go unutilized (or underutilized) because other resources (or lack thereof) may be constraining operation of the artificial intelligence based processing architectures. Thus, artificial intelligence based processing architecture may inefficiently utilize allocated computing resources.

In addition to communication bottlenecks, latency and bandwidth of storage access may have outsized impacts on the quality of artificial intelligence based services. For example, various portions of the artificial intelligence based processing architectures may be performed sequentially. Consequently, storage access induced limits imposed on portions of the artificial intelligence based processing architectures may necessarily impact downstream components in the artificial intelligence based processing architectures. The combination of communication and storage access limits may impact various components of the artificial intelligence based processing architectures, making the root cause of undesired of operation of artificial intelligence based processing architectures difficult to identify and remediate.

In general, embodiments disclosed herein relate to systems, devices, and methods for managing operation of a distributed system that provides, in part, artificial intelligence based computer implemented services in a manner that improves efficiency of use of allocated resources (e.g., computing resource such as hardware components or logical allocations of resources provided by hardware components such as processing cycles, memory space, storage space, communication bandwidth, special purpose processing cycles, etc., and/or instance based scaling). To manage the operation of the system, hardware components to support services provided by the system may be selected based on artificial intelligence based processing architectures that are expected to be used to provide the services.

To select the hardware components, information regarding expected services to be provided (e.g., a goal description and/or supplemental description) may be collected and analyzed to estimate use levels for the services, support levels for the services, and model levels for the services. The aforementioned information may be analyzed to identify (i) an artificial intelligence based processing architecture and (ii) corresponding hardware components usable to support the identified artificial intelligence based processing architecture.

During the aforementioned analysis, communication requirements between components of the artificial intelligence based processing architecture may be used to screen, filter, and/or otherwise discriminate undesirable hardware components (or entire architectures) from desirable hardware components (or entire architectures). For example, hardware components may be analyzed with respect to communication bottlenecks that are likely to be created between components of artificial intelligence based processing architectures. These bottlenecks (and/or other information regarding communication limits) may be used as a basis for discriminating undesirable from desirable hardware components.

Once the hardware components (e.g., in aggregate a selected architecture) are identified, the identified hardware components may be used to update operation of a system to provide the desired computer implemented services. For example, new hardware components may be added and/or existing hardware components may be repurposed for providing the desired computer implemented services.

To manage operation of the artificial intelligence based processing architectures once deployed, queue length and/or other features of the artificial intelligence based processing architectures (e.g., a deployed instance of an artificial intelligence based processing architecture being referred to as an artificial intelligence workflow pipeline) may be monitored. The monitoring may allow for the identification of undesired operation of artificial intelligence workflow pipelines. When such identifications are made, the artificial intelligence workflow pipelines, host hardware components, and data structures used in operation of the artificial intelligence workflow pipelines may be analyzed to identify (i) communication bottlenecks and/or (ii) data access bottlenecks. When identified, the system may take steps to relax the bottlenecks. The steps may include, for example, migrating data structures or components of the artificial intelligence workflow pipelines, instantiating new instances of data structures in new locations (e.g., to reduce communication bottlenecks and/or storage access bottlenecks), adding new hardware components, and/or performing other actions that may address the bottlenecks.

To provide the above noted functionality, the system of FIG. 1 may include client devices 100, managed system 102, management system 104, and communication system 106. Each of these is discussed below.

Client devices 100 may include any number of data processing systems such as devices 111 and 112. Devices 111-112 may be, for example, personal computers issued by an organization to an employee, or another type of computing device. Any of client devices 100 may provide any number and type of computer implemented services to users thereof and/or other devices. As part of providing the services, client devices 100 may utilize services provided by managed system 102. The services may include, for example, artificial intelligence based processing services using artificial intelligence based processing architectures hosted by managed system 102.

Managed system 102 may provide various services to client devices 100 (and/or other devices/entities). To do so, managed system may (i) include hardware and software components corresponding to desired services as indicated by the users (or administrators) of client devices 100, and (ii) host artificial intelligence based processing architectures used to provide, at least in part, the services to client devices 100. Managed system 102 may include any number and type of data processing systems. The data processing systems may independently and/or cooperatively provide various computer implemented services.

Additionally, any of the data processing systems of managed system 102 may host (i) automation frameworks to facilitate changes in operation of managed system 102 as directed by management system 104, (ii) telemetry (or other types of information) reporting systems to provide management system 104 with information regarding the operation of hosted artificial intelligence workflow pipelines, and/or other components to facilitate management of managed system 102 by management system 104.

Management system 104 may manage operation of managed system 102 on behalf of users (or administrators) of client devices 100. To do so, management system 104 may (i) provide a portal or other interface through which users/administrators of client devices 100 may indicate services that are to be provided by managed system 102 (e.g., to client devices 100 and/or other devices not shown in FIG. 1), (ii) select hardware/software components to provide the services (e.g., based on artificial intelligence based processing architectures), (iii) when selecting the components, perform various communication capabilities analysis and reviews to discriminate desirable from undesirable hardware components to support an artificial intelligence based processing architecture, (iv) modify the hardware components (e.g., add/remove/reconfigure/reallocate for use in the identified services) and/or the operation of managed system 102 (e.g., by adding/removing/reconfiguring software components) over time (e.g., based on information from users/administrators of client devices 100 and/or other basis), and/or perform other actions to facilitate provisioning of services by managed system 102.

For example, management system 104 may identify a desirable artificial intelligence based processing architecture through which desired computer implemented services may be provided, identify hardware components to support the architecture, and manage deployment of the artificial intelligence based processing architecture and/or hardware components (and/or reallocation of existing components of managed system 102 to the artificial intelligence based processing services) to managed system 102 to instantiate various artificial intelligence workflow pipelines. Refer to FIG. 2D-2E for additional details regarding artificial intelligence based processing architectures and/or how hardware components to support artificial intelligence based processing architectures that may be selected for deployment.

Once the architecture and hardware components are identified and deployed, management system 104 may monitor operation of the deployed distributed system to identify whether it is performing as expected or performing undesirably (e.g., in an undesired state, such as unexpected operation of artificial intelligence workflow pipelines, etc.). To ascertain the state of the system, management system 104 may monitor operation of the hosted artificial intelligence workflow pipelines to obtain performance metrics (e.g., queue lengths for components of the artificial intelligence workflow pipelines, or other information usable to granularly identify performance of different portions of the artificial intelligence workflow pipelines) for the operation. If the performance is identified as undesirable (e.g., excess queue length), then the artificial intelligence workflow pipelines, host hardware components, data structures used in operation of the artificial intelligence workflow pipelines, and/or other information may be collected to perform root cause analysis. Once a root cause is identified, then actions may be performed to remediate the operation of the artificial intelligence workflow pipelines. Refer to FIGS. 2F-2G for additional information regarding management of operation of artificial intelligence workflow pipelines hosted by managed systems.

When providing their functionality, client devices 100, managed system 102, and/or management system 104 may perform all, or a portion, of the flows and/or methods shown in FIGS. 2A-2C, 2F, and 3A-3B.

Any devices (and/or components thereof) included in the system of FIG. 1 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with a communication system (e.g., 106) utilized by client devices 100, managed system 102, and/or management system 104. In an embodiment, this communication system includes one or more networks that facilitate communication between any number of components. The networks may include wired networks and/or wireless networks (e.g., and/or the Internet). The networks may operate in accordance with any number and type of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, data flow diagrams in accordance with an embodiment are shown in FIGS. 2A-2C and 2F-2G. These data flow diagrams may illustrate how data may be obtained and used within the system of FIG. 1.

In the data flow diagrams, flows of data and processing of data are illustrated using different sets of shapes. In the context of these data flow diagrams, a first set of shapes (e.g., 200, 206, etc.) is used to represent data structures, a second set of shapes (e.g., 204, 220, etc.) is used to represent processes performed using and/or that generate data, and a third set of shapes (e.g., 205, 222, etc.) is used to represent large scale data structures such as databases.

Figure 2A:
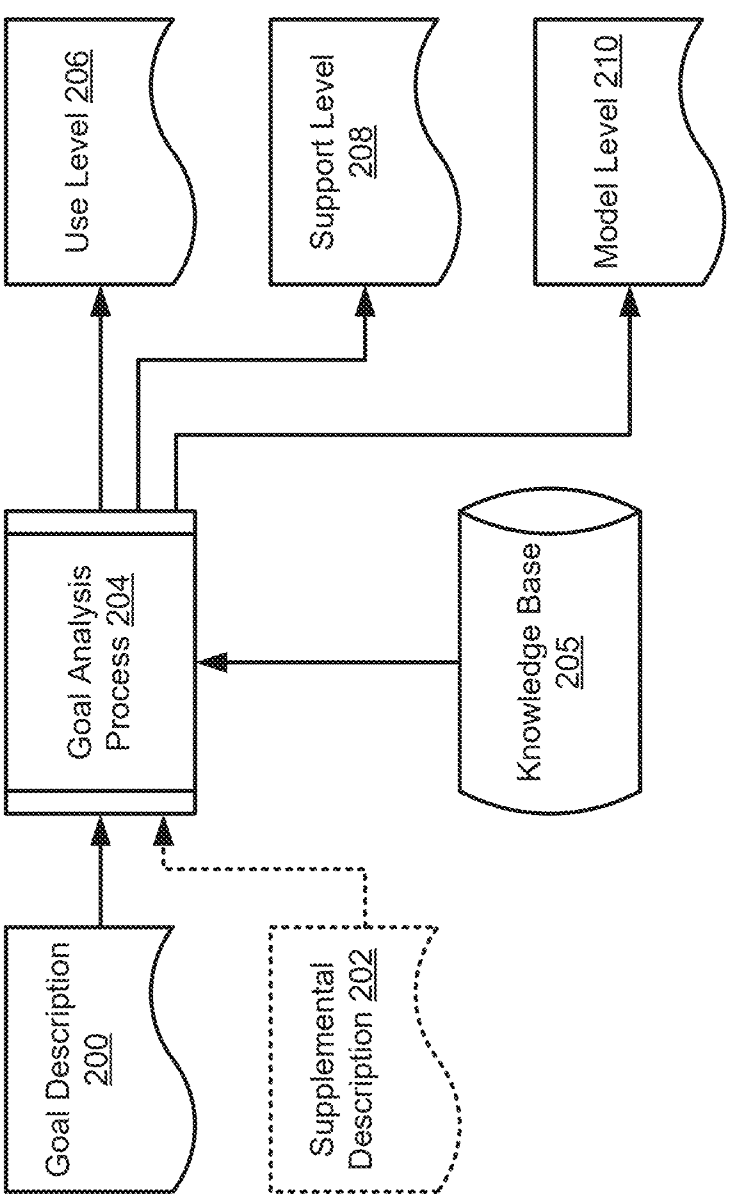
FIGS. 2A-2C and 2F show data flow diagrams illustrating processing of data in accordance with an embodiment.

Turning to FIG. 2A, a first data flow diagram in accordance with an embodiment is shown. The first data flow diagram may illustrate data used in and data processing performed in providing desired computer implemented services using managed system.

To provide the desired computer implemented services, information regarding desired services may be obtained. The information may take the form of, for example, responses to guided survey questions designed to elucidate desired uses for services to be provided by a managed system. The guided surveys may be presented via the portals, discussed above, and/or via other processes. Various users/administrators of an organization may provide responses via the guided surveys. The resulting aggregated information may be goal description 200.

In addition to goal description 200, other types of information may also be obtained. For example, existing uses of computer implemented services by the organization may be obtained. To do so, (i) information regarding the existing uses may be collected via survey, (ii) observability agents may be deployed to existing systems (e.g., client systems) to collect information regarding uses of existing systems/services, (iii) information regarding the field of operation of the organization may be collected and used as a basis for inferring various goals for desired services (e.g., an inference model such as a trained machine learning model may be used, the model may be trained based on historic information regarding organizations, actual desired uses for the to-be-provided services, and classifications for the organizations such as economic sector, organization size, etc.), and/or other types of information may be collected.

Once obtained, goal description 200 and supplemental description 202 may be ingested by goal analysis process 204. During goal analysis process 204, goal description 200 and/or supplemental description 202 may be analyzed based on knowledge base 205 to identify (i) use level 206, (ii) support level 208, and (iii) model level 210. Knowledge base 205 may include information regarding previously deployed and used artificial intelligence based processing architectures, and corresponding previously obtained goal descriptions and/or supplemental descriptions. Knowledge base 205 may be analyzed to identify a most similar goal description, supplemental description 202, and corresponding artificial intelligence based processing architecture. The corresponding artificial intelligence based processing architecture may be selected for use to provide the desired computer implemented services.

However, it will be appreciated that goal description 200 and supplemental description 202 may be significantly different from previously encountered goal descriptions and supplemental descriptions. In such scenarios, when the difference exceeds a threshold level, a subject matter expert may be used to define the artificial intelligence based processing architecture based on goal description 200 and supplemental description 202. Refer to FIG. 2C for additional information regarding artificial intelligence based processing architectures.

Returning to the discussion of FIG. 2A, once the artificial intelligence based processing architecture (e.g., an artificial intelligence workflow pipeline) is identified, the architecture may be analyzed to identify use level 206, support level 208, and model level 210.

Use level 206 may include information regarding a level of use expected for the artificial intelligence based processing architecture. Use level 206 may be used, for example, to identify how many instances of components of the artificial intelligence based processing architecture are to be instantiated to service the expected load on the service. Use level 206 may be identified, for example, by comparing an expected number of service requests per unit time (e.g., indicated by goal description 200) to typical service requests per unit time that can be achieved by the components of the artificial intelligence based processing architecture when deployed to typical hardware components (e.g., such information may be stored in knowledge base 205, and may be based on historic information from previously deployed artificial intelligence based processing architectures). The number of instances of each of the components may then be stored with use level 206, and used as a basis for analyzing the architectures for potential bottlenecks and/or other features.

Support level 208 may include information regarding services expected to be used to support the artificial intelligence services. The information may include, for example, numbers and types of such services which may include, for example, retrieval augmented generation, distillation, reinforced learning, etc. These services may support the generative or inferential services provided by a trained inference model (e.g., trained machine learning model) by, for example, enhancing prompts (e.g., retrieval augmented generation), customizing/refining models (e.g., reinforced learning, transfer learning, etc.), etc.

Model level 210 may include information regarding the type of model to be used in the artificial intelligence based processing architecture. For example, model level 210 may include information regarding the size of the model, complexity of revising the model, compatibility with other services (e.g., specified by support level 208), features of the architecture of the model (e.g., attention layers/other features), etc.

Figure 2B:
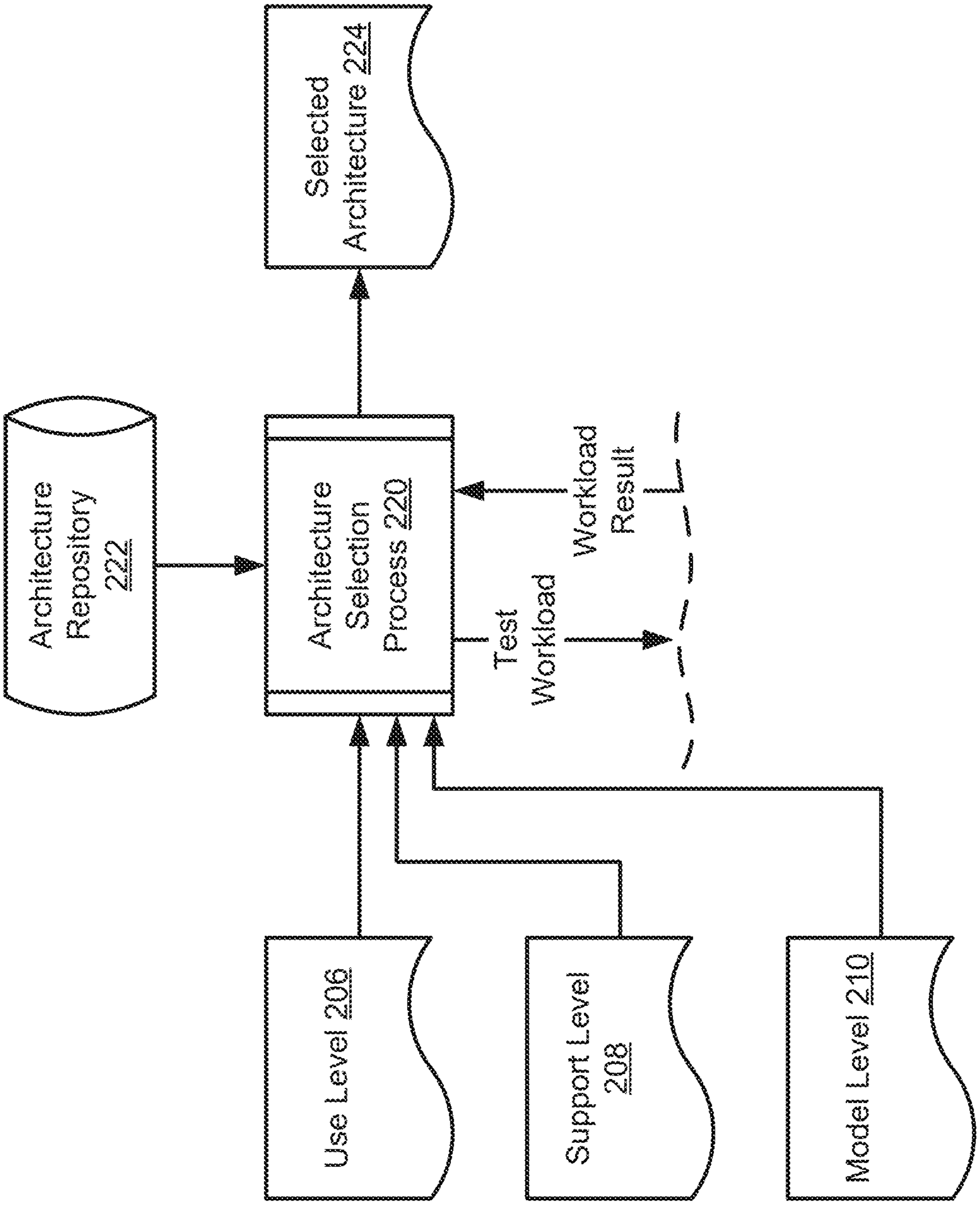
Figure 2C:
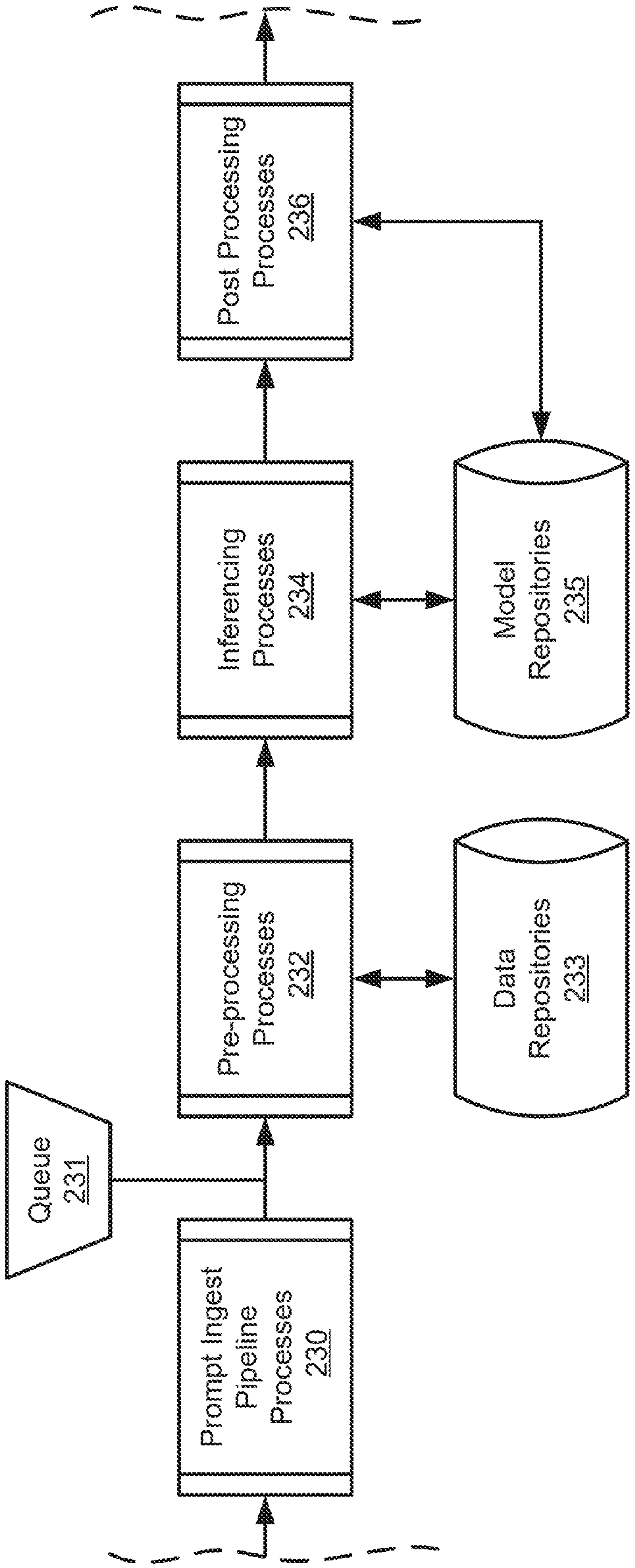
Figure 2D:
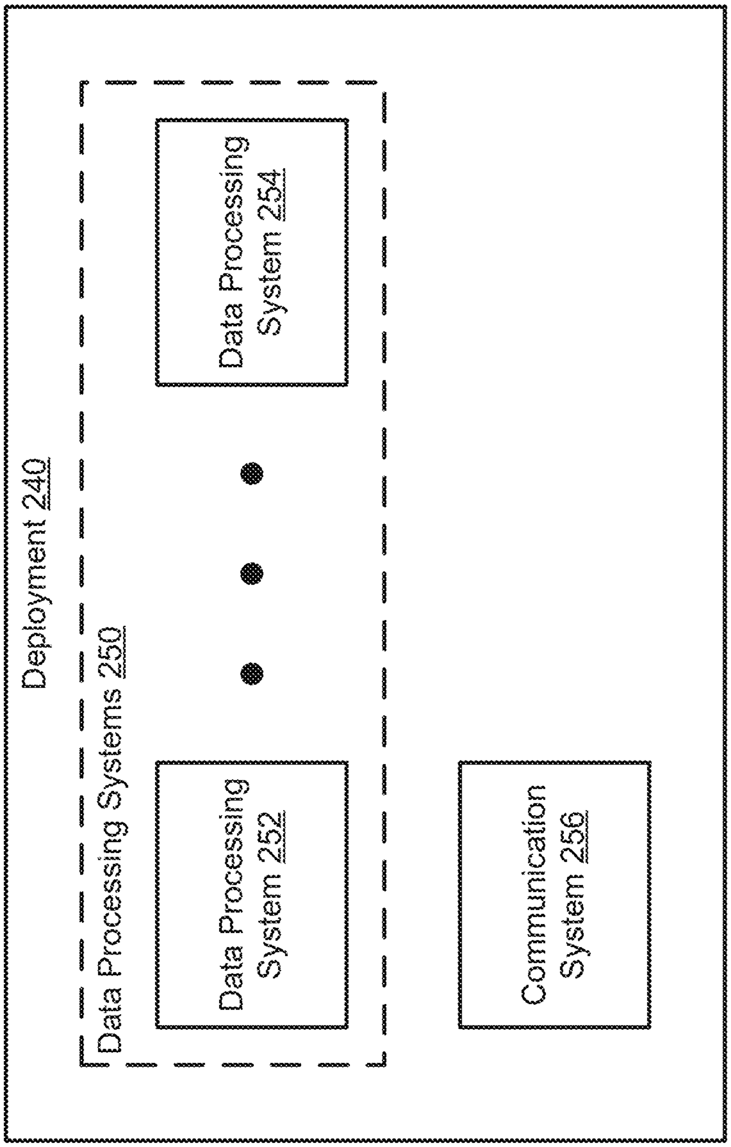
FIGS. 2D-2E and 2G show block diagrams illustrating hardware systems in accordance with an embodiment.
Figure 2E:
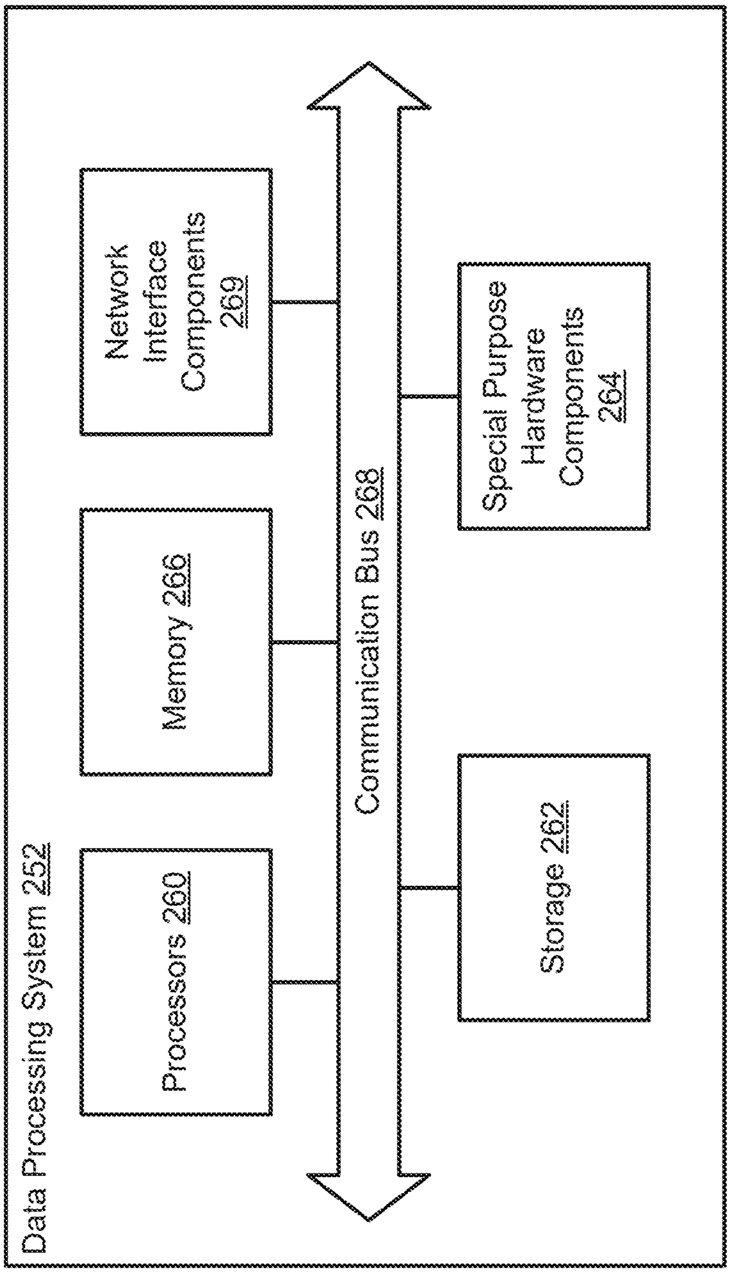
Figure 2F:
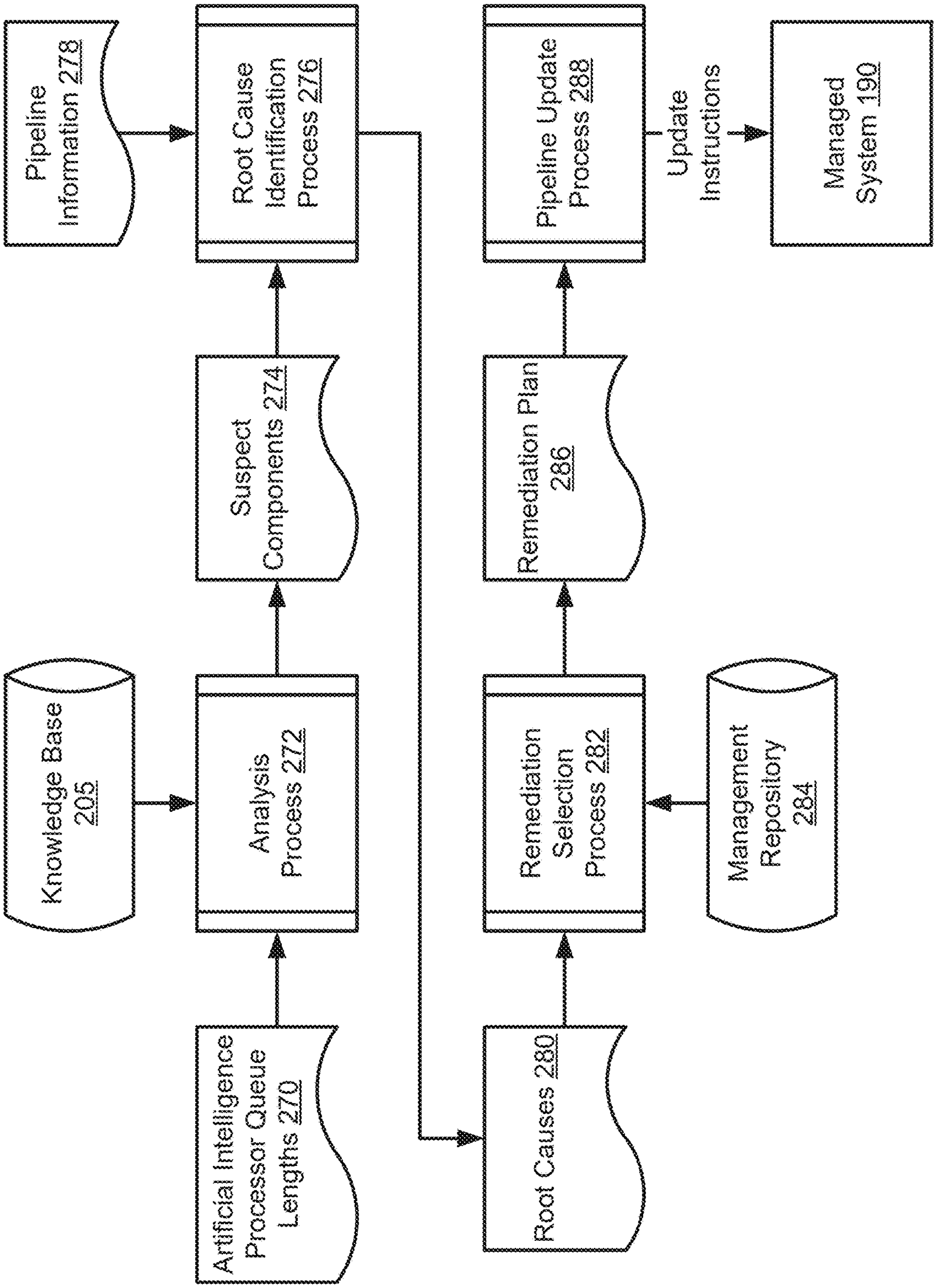
Figure 2G:
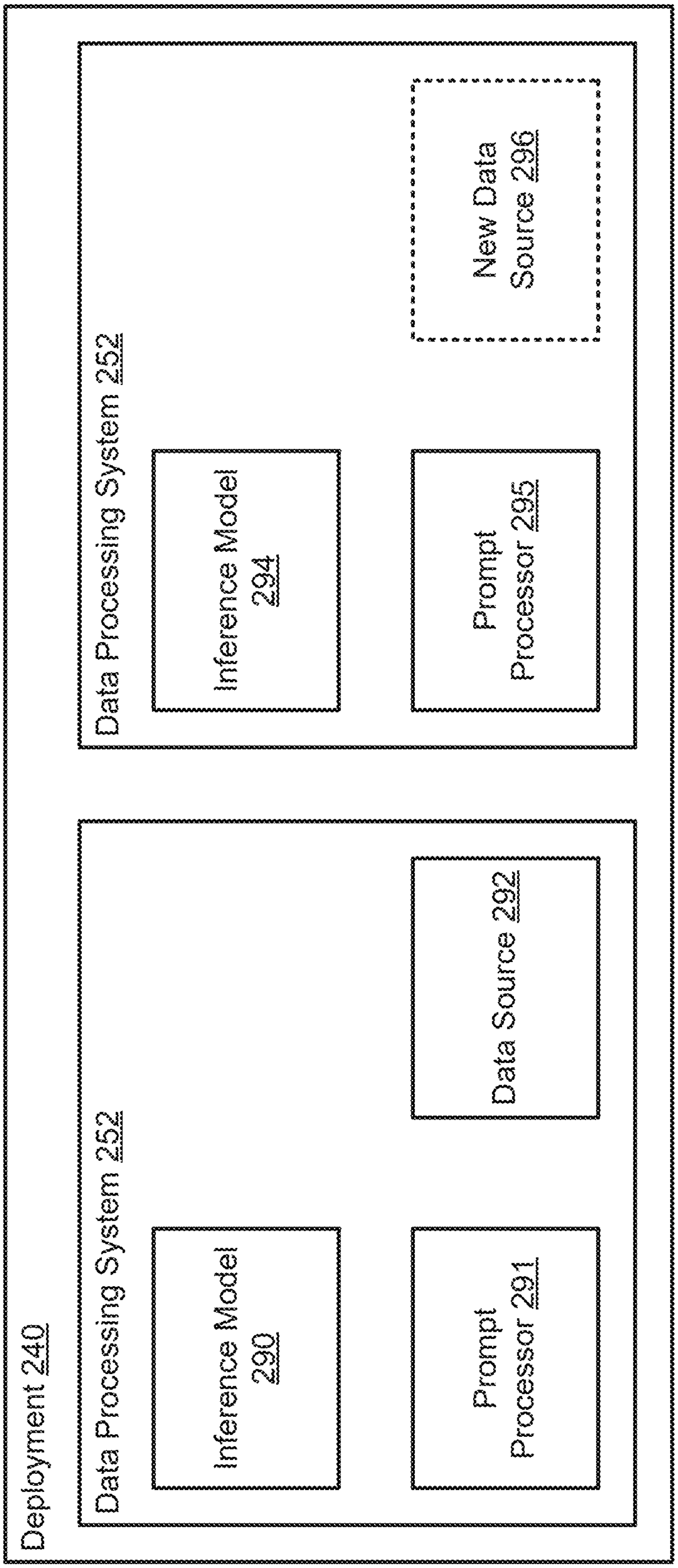

The aforementioned use level 206, support level 208, and model level 210 may be used to identify a hardware architecture to support the artificial intelligence based processing architecture, as discussed further with respect to FIG. 2B.

Knowledge base 205 may be implemented with a data repository, and may include any type and quantity information regarding any number of previously used artificial intelligence based processing architectures, artificial intelligence (AI) models, correspondingly performance of AI workloads by the models after deployment, information regarding development of the models (e.g., model training where training data is used to define model parameters, inferencing where a model ingests data and generates an output, model updating during which previously defined model parameters are updated based on new training data, etc.), information on which the artificial intelligence based processing architectures and/or models were selected (e.g., such as previously obtained goal descriptions, supplemental descriptions, etc.), and/or other types of information.

To differentiate information regarding the AI models, knowledge base 205 may be organized as, for example, a table including rows, each respective row corresponding to one of the AI models, architectures, and/or other type of structured data.

For example, each row may include information regarding a corresponding AI model, architecture, and/or references to other data structures that include information regarding the corresponding AI models/architectures. Further, the rows may be keyed to facilitate efficient searches for data regarding properties of the corresponding AI model/architecture, and basis (e.g., goal description/supplemental descriptions).

Turning to FIG. 2B, a second data flow diagram in accordance with an embodiment is shown. The second data flow diagram may illustrate data used in and data processing performed in deployment of an artificial intelligence based processing architecture.

To deploy the artificial intelligence based processing architecture, use level 206, support level 208, and model level 210 may be ingested by architecture selection process 220 and through which a selected architecture 224 may be identified. During architecture selection process 220, various hardware components to support the artificial intelligence based processing architecture identified via the flow shown in FIG. 2A may be identified and selected.

To identify and select the components, use level 206 and model level 210 may be used to select a number of candidate hardware components from architecture repository 222. Architecture repository 222 may include information regarding various hardware components that may be used to host an artificial intelligence based processing architecture. Generally, the hardware components may include processors, memory devices, storage devices, special purposes hardware components (e.g., graphics processing units, data processing units, etc.), communication devices (e.g., network interface cards, communication buses, etc.), and/or other types of hardware components (e.g., such as interconnect components like motherboards). Each of the components may be rated in architecture repository 222 with respect to an ability to serve as a host for a component of the artificial intelligence based processing architecture. For example, each hardware component may be rated with respect to the type of component of the artificial intelligence based processing architecture that it may support, the processing capabilities (e.g., throughput), and/or other characteristics that may be used to select a hardware component.

It will be appreciated that architecture repository 222 may include similar information for various aggregations of hardware components such as at a server level, a rack level, an aisle level (e.g., multiple racks), etc. may also be included in architecture repository 222. Thus, in some cases, architecture repository 222 may include information regarding select potential aggregate options.

Based on the information in architecture repository 222, a number of candidate hardware components may be identified to support the artificial intelligence based processing architecture. Refer to FIGS. 2D-2E for additional information regarding hardware components that may support artificial intelligence based processing architectures.

Once the candidate hardware components are identified, the candidate hardware components may be analyzed based on support level 208 to identify (i) placements of components of the artificial intelligence based processing architecture with the candidate hardware components (e.g., may be made based on subject matter expert rules, or other types of rules), and (ii) any communication bottlenecks present in the candidate hardware components that may prevent the corresponding candidate hardware components from providing the processing throughput as indicated by the information in architecture repository 222.

To identify the communication bottlenecks, any process may be performed. For example, subject matter expert rules may be used to analyze the hardware components for such communication bottlenecks, testing of similar hardware components with test workloads may be performed to obtain workload results, etc.

For example, to actively test for communication bottlenecks, test workloads that are representative of the expected use of the artificial intelligence based processing architecture may be deployed to a test hardware setup which may be similar to the candidate hardware components. When deployed, the actual operation of the test workloads may be monitored to identify whether performance of the test workloads meets expectations based on the information included in architecture repository 222. If a deviation from the expected performance is identified, then the candidate hardware component may be removed from consideration. The aforementioned process may be repeated until all deviating hardware components are removed from the candidate hardware components. The remaining candidate hardware components may then be used as a basis for selected architecture 224.

For example, selected architecture 224 may be a list of the numbers and types of the candidate hardware components, the components of the artificial intelligence based processing architecture and placement information with respect to the hardware components, etc. It will be appreciated that selected architecture 224 may include additional, less, and/or different information.

Once selected architecture 224 is obtained, then the artificial intelligence based processing architecture may be deployed to a managed system. As part of the deployment, existing hardware components (that are not yet allocated) of managed system meeting the requirements of selected architecture 224 may be allocated for the artificial intelligence based processing architecture, new hardware components may be added to the managed system, and components of the artificial intelligence based processing architecture may be instantiated on the allocated hardware components of the managed system.

Once instantiated, the artificial intelligence based processing architecture may begin to operate to provide desired computer implemented services. Refer to FIG. 2C for additional information regarding artificial intelligence based processing architectures.

Turning to FIG. 2C, a third data flow diagram in accordance with an embodiment is shown. The third data flow diagram may illustrate data used in and data processing performed in operation of an artificial intelligence based processing architecture.

To operate the artificial intelligence based processing architecture, various components of the artificial intelligence based processing architecture may be deployed to various hardware components allocated for the artificial intelligence based processing architecture to obtain artificial intelligence workflow pipelines (e.g., an example illustrated in FIG. 2C).

For example, the artificial intelligence based processing architecture may include various processes (e.g., 230, 232, 234, 236) for providing artificial intelligence based processing services. However, it will be appreciated that the processes shown in FIG. 2C are just an example and other artificial intelligence based processing architectures may include other types of processes.

Generally, the artificial intelligence based processing architecture may include at least one prompt ingest pipeline processes 230. During prompt ingest pipeline processes 230, prompts for an artificial intelligence model may be obtained and/or partially pre-processed based on various rules for prompts.

Once obtained, the prompts (as processed) may be subjected to various pre-processing processes 232 such as retrieval augmented generation, templating, etc. During such pre-processing processes, information from various data repositories 233 may be obtained and used as context for the prompt. Likewise, various templates for the prompts may be obtained and populated.

It will be appreciated that data repositories 233 may generally be stored in storage, and pre-processing processes 232 may be executing on processors. Depending on the topology of the communication system interconnecting these hardware components, the communication system may limit the ability of the hosted components to efficiently utilize the host hardware components. For example, communication bottlenecks may limit the ability of information to be retrieved from data repositories 233 and vetted for use as context for the prompt, even though neither hardware component hosting the architecture component (e.g., 232, 233) is limiting activity of the hosted architecture component. Likewise, limits on access to data repositories 233 imposed by storage device hosting the repositories may put storage access based limits on operation of pre-processing processes 232. Thus, a first example communication bottleneck that may impact operation of the artificial intelligence based processing architecture is illustrated.

Once pre-processed (e.g., enhanced with contextual information), the prompt (e.g., at least, contextual information and/or other information may also be submitted) may be submitted to inferencing processes 234, and used as an input to a trained model from model repositories 235. The model may be any type of trained machine learning model. Like pre-processing processes 232 and data repositories 233, communication bottlenecks between inferencing processes 234, model repositories 235, and the other components of the artificial intelligence based processing architecture may artificially limit the rate of operation of inferencing processes 234.

Once an inference is obtained based on the prompt, post processing processes 236 may be performed. Post processing processes 236 may include, for example, reinforced learning, rule application (e.g., screening inferences), and/or other processes to obtain a final response to the prompt and/or update operation of the artificial intelligence based processing architecture. Again, like the other components of the artificial intelligence based processing architecture, the throughput of post processing processes 236 may be artificially limited due to communication bottlenecks.

To avoid such limits, the communication capabilities of the candidate hardware components may be analyzed, as discussed above, and serve as a basis for exclusion. To further explain such limits, example diagrams of a potential deployment 240 in accordance with an embodiment are shown in FIGS. 2D-2E, below.

Of course, it will be appreciated that the artificial intelligence workflow pipelines may naturally face various processing workloads that may slow down the artificial intelligence workflow pipelines. To handle such slow downs of components of the artificial intelligence workflow pipelines, various queues (e.g., 231) may be used to manage processing downtime between components of the artificial intelligence workflow pipelines. For example, as prompts are received and pre-processing processes 232 are performed, the prompts may be added to queue 231 for subsequent pre-processing processes 232 which servicing is available.

However, excessive slowdown of some of the components of the artificial intelligence workflow pipelines may indicate that some of the components are being impacted by bottlenecks. For example, queue 231 may have a typical average depth that if exceeded indicates that a communication or storage access bottleneck may be impacting pre-processing processes 232.

As will be discussed below, the depths of the queues may be monitored and used to infer whether various components of the artificial intelligence workflow pipelines are being impacted by unexpected bottlenecks that should be addressed. For example, if data repositories 233 are hosted by a storage device that is creating a bottleneck, then the root of a slow down in operation of the artificial intelligence workflow pipelines may be corresponding identified and remediated.

Turning to FIG. 2F, a fourth data flow diagram in accordance with an embodiment is shown. The fourth data flow diagram may illustrate data used in and data processing performed in managing operation of artificial intelligence workflow pipelines.

To manage the operation, information regarding the operation of artificial intelligence workflow pipelines may be collected from host managed system. For example, the information may include artificial intelligence processor queue lengths 270, which may include information regarding the lengths (and/or other characteristics) of queues for components of the artificial intelligence workflow pipelines. A queue length may be, for example, a number of requests in the queue that have not been processed, a ratio of requests in the queue to a total queue length of the queue (e.g., maximum number of requests), and/or may include additional, less, and/or different information.

Once artificial intelligence processor queue lengths 270 are obtained, analysis process 272 may be performed to identify any number of suspect components 274. During analysis process 272, the queue lengths may be compared to criteria from knowledge base 205. The criteria may be, for example, typical queue lengths (e.g., historic) for corresponding components of artificial intelligence workflow pipelines, acceptable queue lengths (e.g., subject matter expert defined), and/or other basis for comparison. The comparison may be used to identify whether the queues for any number of components indicate that the corresponding components may be being impacted by bottlenecks (e.g., communication, storage access, etc.). Any such identified components may be added to suspect components 274.

Suspect components 274 may then be used during root cause identification process 276 to identify root causes for the bottlenecks. During root cause identification process, pipeline information 278 for suspect components 274 may be obtained. Pipeline information 278 may include information regarding the artificial intelligence workflow pipeline and host hardware components to identify any potential communication bottlenecks and/or storage access bottlenecks. For example, dependencies on communications/storage access by the components of the artificial intelligence workflow pipelines may be analyzed to identify potential issues in the allocated resources.

If an issue is identified, the issue may be identified by issuing test workloads, as discussed with respect to FIG. 2B, to confirm the issue. In the context of an example such as retrieval augmented generation, a databases search to obtain context for prompts may be a bottleneck if the communication to the storage device is saturated or the storage device itself is overworked. To confirm the issue, a test workload may be issued to the host hardware device hosting the retrieval augmented generation program to retrieve data from a storage device that stores the information searched during the retrieval augmented generation process. The process may be monitored (e.g., latency) and information regarding the process may be returned and analyzed in view of historical information for similar components/hardware components to ascertain whether communication, storage access, or other root cause issues are causing the excessive queue length (e.g., any being a root cause).

Once one or more root causes 280 for the suspect components are identified, remediation selection process 282 may be performed to obtain a remediation plan (e.g., 286). During remediation selection process 282, root causes 280 may be analyzed to identify how to remediate them. The remediations for the root causes may include, for example, migration of data structures used by components of artificial intelligence workflow pipelines and/or components of the artificial intelligence workflow pipelines (e.g., to eliminate communication/storage access bottlenecks by moving the components/used data structures), instantiation of new copies of the data structures used by the components of the artificial intelligence workflow pipelines, adding additional computing resources (e.g., via addition/exchange of new hardware components), etc.

To decide on how to remediate the root cause issues, an optimization process may be performed. During the optimization process, various constraints from management repository 284 may be used to ascertain a best fit for remediating the root cause issue. The constraints may, for example, weight various factors in decision making regarding whether to migrate, replicate, add new resources, etc. to address each root cause.

For example, an objective function may be used to evaluate any number of potential ways to remediate each root cause. The objective function may use the constraints to weight or otherwise take into account different aspects of each approach to the remediating each root cause.

For example, management repository 284 may include information for constraints regarding (i) preferences for types of remediation (e.g., data/component migration versus replication), (ii) cost limits for remediations of root causes (e.g., adding new hardware components may have corresponding cost), (iii) balancing impact on other components of the artificial intelligence workflow pipelines against remediating the root causes (e.g., migrating a database used by the pipeline may impact multiple components of the pipeline), (iv) criteria for acceptable versus unacceptable remediation (e.g., the required level of reduction of queue lengths), (v) bandwidth use goals (e.g., may guide in placement) for operation of the artificial intelligence workflow pipelines, and/or other goals for operation of the managed system and hosted artificial intelligence workflow pipelines.

Some of the above constraints may require, for example, information regarding how various remediations are likely to impact operation of the artificial intelligence workflow pipelines. To evaluate the objective function (e.g., to find a remediation deemed best by the criteria) for these constraints, future operation of the artificial intelligence workflow pipelines after various remediations may be simulated using any of (i) analytical models, (ii) digital twins, and/or other simulation components.

To identify potential remediation plans for each root cause, management repository 284 may include information regarding how different types of root causes may be remediated. For each root cause, a potential remediation plan for each way that the root cause may be remediated may be established. These potential remediation plans may then be evaluated (e.g., ranked) using the objective function to identify a best potential remediation plan for each root cause. These remediation plans deemed best by the objective function may then be added to remediation plan 286.

Once remediation plan 286 is obtained, pipeline update process 288 may be performed. During pipeline update process 288, remediation plan 286 may be performed. To perform the plan, various update instructions may be sent to the automation framework of one or more managed systems (e.g., 190) hosting portions of the artificial intelligence workflow pipeline. These instructions may cause, for example, components of the artificial intelligence workflow pipeline to be migrated, components of the artificial intelligence workflow pipeline to be replicated, data structures used by the artificial intelligence workflow pipeline to be migrated and/or replicated, new hardware components to be added to managed system 190 (and/or migration/instantiation of new components/data structures on the new hardware components), etc.

Once the remediation plan is completed, the operation of the artificial intelligence workflow pipeline hosted by managed system 190 may continue to be monitored as discussed with respect to analysis process 272.

For example, turning to FIG. 2G a diagram of an deployment 240 in accordance with an embodiment is shown. Deployment 240 may include data processing systems 252-254 which may host components of an artificial intelligence workflow pipeline.

The components may include inference models (e.g., 290, 294), prompt processors (e.g., 291, 295), and a data source 292 (e.g., a retrieval augmented generation database) used by the prompt processors. The components may cooperatively provide artificial intelligence services by (i) obtaining prompts, (ii) obtaining contextual information for the prompts from data source 292, and (iii) using the prompts and contextual information as ingest to the inference models to obtain responses. The responses may be used to provide desired computer implemented services.

As illustrated in FIG. 2G, initially, the artificial intelligence workflow pipeline may only include a single instance of data source 292 (e.g., based on historical data that suggested that a single instance is sufficient). However, now consider a scenario where data processing system 252 and data processing system 254 are operably connected by a poorly performing communication system. Consequently, use of data source 292 by prompt processor 295 may be impeded by the poor connectivity thereby slowing the processing of prompts for contextual information enhancement.

Using the data flow discussed with respect to FIG. 2G, analysis of the queue for prompt processor 295 may indicate that there is an issue impacting prompt processor 295. Based on the identification, a test workload may be deployed and may reveal the poor performance of obtaining data from data source 292, identifying lack of access to data source 292 as a root cause of undesired operation of the artificial intelligence workflow pipeline.

Based on the identification, potential remediations may be identified and may include, for example, migrating prompt processor 295 to data processing system 252, migrating data source 292 to data processing system 254, and replicating data source 292. To select one of the potential remediations, an objective function may be used based on criteria supplied by a manager/operator of deployment 240. In this example, the criteria and objective function may indicate that replication of data source 292 is most likely to successfully resolve the root cause. However, it will be appreciated that other potential remediations such as replication/migration of data source 292 to other data processing systems may also be considered, and may be selected should the criteria provided by the operator warrant such selection (e.g., in this example, the criteria may heavily weight performance and may be cost/resource insensitive).

Based on the selection, the remediation may be performed which may replicate data source 292 as new data source 296 (drawn in dashing to indicate that it may not always be present in this example). Once replicated, prompt processor 295 may be directed to use the replicated copy of data source 292 rather than data source 292, thereby mitigating the root cause of the poor performance of the artificial intelligence workflow pipeline.

Accordingly, the artificial intelligence workflow pipeline may begin to operate in a desirable manner. It will be appreciated that other types of remediation operations such as resource allocation through scaling of instances of prompt processor 295 were unlikely to address the root cause. Thus, the disclosed systems and methods may provide a system that is better able to provide desired computer implemented services by identifying root causes of issues that conventional approaches to manage (e.g., resource scaling) are unlikely to address.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Turning to FIG. 2D, a block diagram of an example deployment 240 in accordance with an embodiment is shown. Deployment 240 may be a generalized diagram of the same deployment illustrated in FIG. 2G. Deployment 240 may include any number of data processing systems 250. The data processing systems (e.g., 252, 254) may be connected to each other via communication system 256.

Data processing systems 250 may include hardware components that may host components of an artificial intelligence based processing architecture. Refer to FIG. 2E for additional details regarding potential hardware components of a data processing system.

Data processing systems 250 may be operably connected via communication system 256. Communication system 256 may include various communication components such as a switches, routers, etc. These communication components may enable the data processing systems to communicate with one another. Because the artificial intelligence based processing architecture may be distributed across data processing system 250, the communication limits imposed by communication system 256 may limit operation of the hardware components of data processing systems 250 supporting the artificial intelligence based processing architecture.

For example, if some data processing systems (e.g., 254) serve as storage repositories for retrieval augmented generation, but other data processing systems (e.g., 252) process prompts, then the ability of information necessary to provide context for the prompts to be collected may be by communication system 256 rather than the data processing systems themselves. Accordingly, as described, inter-device communication limits may prevent expected operation of artificial intelligence based processing architectures for the given available hardware components.

Turning to FIG. 2E, a block diagram of an example data processing system 252 in accordance with an embodiment is shown. Any of data processing systems 250 may be similar to data processing system 252.

To support operation of the artificial intelligence based processing architecture, data processing system 252 may include various hardware components such as processors 260 (e.g., central processing units), storage 262 (e.g., storage devices, controllers, etc.), memory 266 (e.g., memory modules, transitory), and special purpose hardware components 264 (e.g., graphics/data processing units). The hardware components may be operably connected to each other via a communication bus (e.g., 268), point to point communication links, and/or other communication architectures. Additionally, the hardware components may include a network interface component (e.g., 269, a network interface card, etc.) to enable communications to be routed to other data processing systems.

To support the artificial intelligence based processing architecture, various components of the artificial intelligence based processing architecture may be hosted by the hardware components. For example, trained machine learning models, training programs, etc. may be hosted by special purpose hardware components 264, while processors 260 may host various pre and post processing components of the artificial intelligence based processing architecture. Likewise, storage 262 may host various data structures (e.g., repositories of information) used in the processing such as trained machine learning model copies, repositories of contextual information for prompt enhancement, etc.

The operation of any of these hardware components may be limited due to the communication components supporting their operation. For example, if processors 260 host a pre-processing components such as a retrieval augmented generation process that utilizes contextual information hosted by storage 262, communication bus 268 may limit the rate at which the information may be retrieved should the communication bus be saturated with other traffic (e.g., such as when loading trained machine learning models into special purpose hardware components, transferring context information to other data processing systems, etc.). Accordingly, as described, intra-device communication limits may prevent expected operation of artificial intelligence based processing architectures for the given available hardware components.

To manage these limits, as discussed above, hardware components may be selected, at least, on this basis to prevent them from negatively impacting operation of the artificial intelligence based processing architecture.

While illustrated in FIG. 2E with an example set of hardware components, a data processing system may include fewer, different, and/or additional hardware components without departing from embodiments disclosed herein.

Figure 3A:
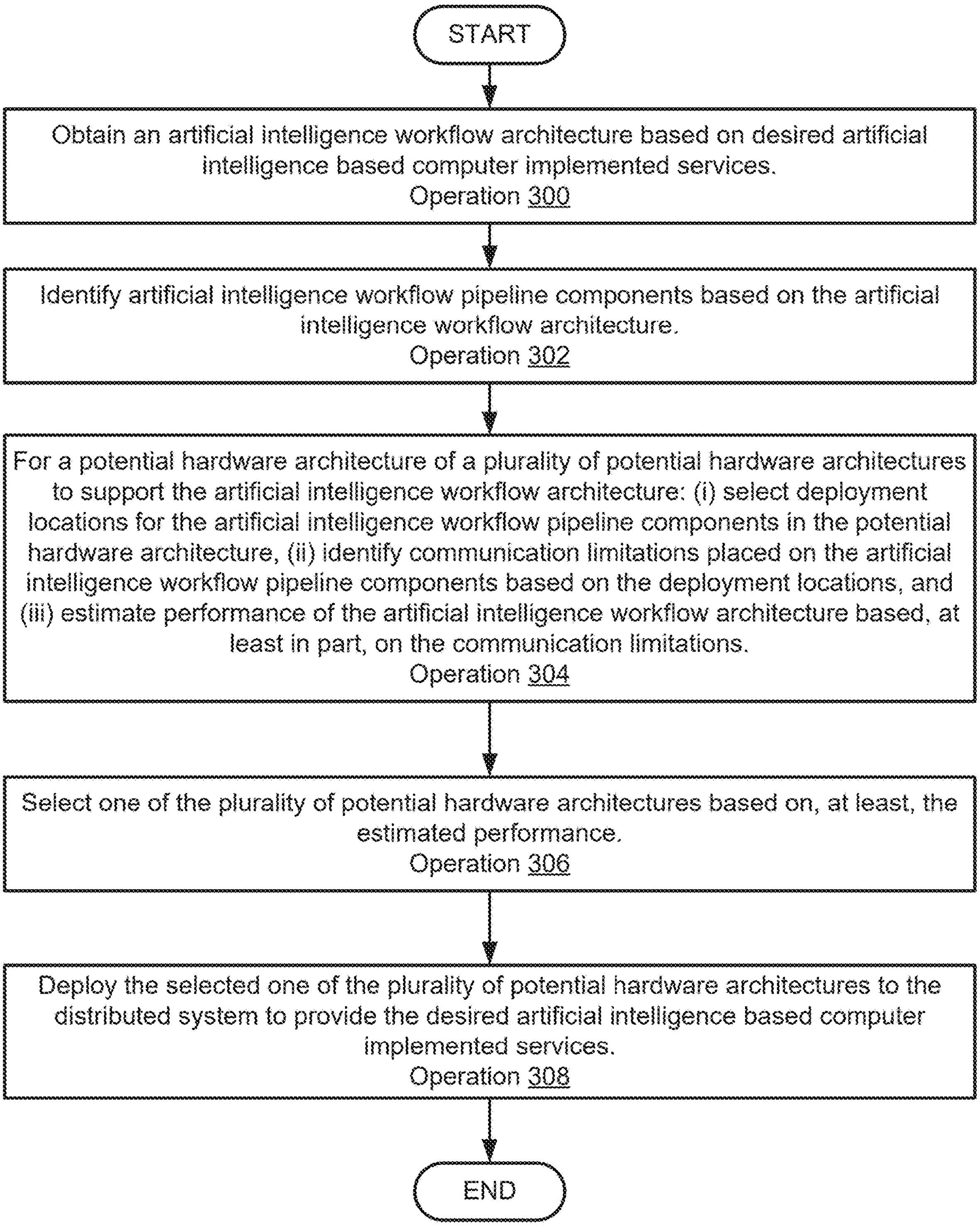
FIGS. 3A-3B show flow diagrams illustrating methods for managing operation of a system in accordance with an embodiment.
Figure 3B:
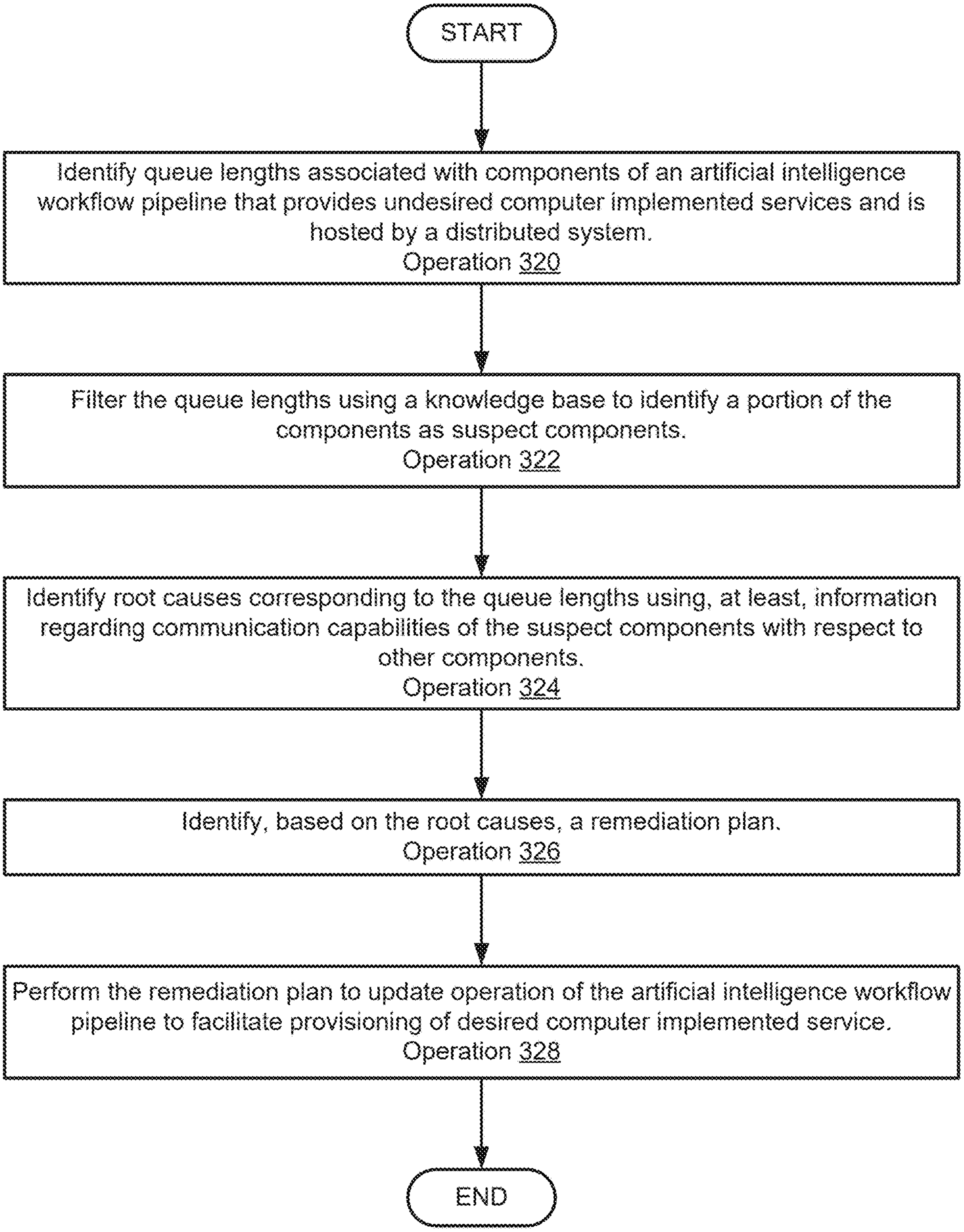

As discussed above, the components of FIG. 1 may perform various methods to manage the operation of managed systems to provide desired computer implemented services. FIGS. 3A-3B illustrate methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method for managing operation of a managed system in accordance with an embodiment is shown. The method may be performed by any of the components of the system of FIG. 1.

At operation 300, an artificial intelligence workflow architecture that is based on desired artificial intelligence based computer implemented services is obtained. The artificial intelligence workflow architecture may be obtained by obtaining information regarding the desired artificial intelligence based computer implemented services (e.g., via a portal or other interface) and using the information to identify the artificial intelligence workflow architecture. For example, historic information regarding previously deployed artificial intelligence workflow architectures and desired artificial intelligence based computer implemented services (on which the architectures were based) may be used to identify the artificial intelligence workflow architecture.

Once identified, use levels, support levels, and model levels may be identified based on the artificial intelligence workflow architecture and/or the information regarding the desired use of the artificial intelligence based computer implemented services. The aforementioned levels may be identified, for example, based on historic information, based on analytical models regarding such use, support, and models, and/or via other methods (e.g., trained inference models may be used).

At operation 302, artificial intelligence workflow pipeline components may be identified based on the artificial intelligence workflow architecture. The types of the artificial intelligence workflow pipeline components may be identified, for example, based on the support level and model level. The number of each type may be selected based on the use level for the artificial intelligence based computer implemented services.

For example, to identify the components, a use level for the desired artificial intelligence based computer implemented services, a support level for the desired artificial intelligence based computer implemented services, and a model level for the desired artificial intelligence based computer implemented services may be identified.

The use level may be a quantification of, at least, an expected frequency of use of the desired artificial intelligence based computer implemented services.

The support level may be based on services (e.g., prompt templating, retrieval augmented generation, reinforced learning, model distillation, etc.) that will support operation of an inferencing component of the artificial intelligence workflow architecture.

The model level may be a quantification of a size of an inferencing component of the artificial intelligence workflow architecture.

At operation 304, for a potential hardware architecture of a plurality of potential hardware architectures to support the artificial intelligence workflow architecture: (i) deployment locations for the artificial intelligence workflow pipeline components in the potential hardware architecture may be selected, (ii) communication limitations placed on the artificial intelligence workflow pipeline components based on the deployment locations may be identified, and (iii) performance of the artificial intelligence workflow architecture may be estimated based, at least in part, on the communication limitations.

The deployment locations may be selected based on, for example, subject matter expert rules, historic information regarding previously deployed artificial intelligence workflow architectures, and/or other methods.

The communication limits may be identified by, for a data processing system of the potential hardware architecture: identifying a communication bus connecting a processor of the data processing system serving as a first deployment location of the deployment locations, a storage device serving as a second deployment location of the deployment locations, and a special purpose hardware component serving as a third deployment location of the deployment locations; and estimating limits imposed on operation of a portion of the artificial intelligence workflow pipeline components when positioned at the first deployment location, the second deployment location, and the third deployment location.

The limits imposed on operation of a portion of the artificial intelligence workflow pipeline components may be estimated by (i) applying subject matter expert defined rules, (ii) using analytical approaches, and/or (iii) via testing through test workload deployment to similar systems. The limits may be reductions in the throughput rates of the portion of the artificial intelligence workflow pipeline components from a nominal rate based on the host hardware.

The performance of the artificial intelligence workflow architecture based, at least in part, on the communication limitations may be estimated using analytical approaches, subject matter expert defined rules, testing of similar systems (e.g., active or historical), and/or via other methods.

The aforementioned process may be repeated for any number of potential hardware architectures to discriminate acceptable from unacceptable hardware architectures. In other words, potential hardware architectures that are estimated to have reduced performance may be eliminated as candidates, and/or the potential hardware architectures may be rank ordered based on the estimated performance.

At operation 306, one of the plurality of potential hardware architectures may be selected based on, at least, the estimated performance. The best ranked potential hardware architecture may be selected.

At operation 308, the selected one of the plurality of potential hardware architectures may be deployed to the distributed system to provide the desired artificial intelligence based computer implemented services. The selected one may be deployed by (i) allocating existing components of the distributed system for the desired artificial intelligence based computer implemented services, (ii) adding and allocating new components to the distributed system for the desired artificial intelligence based computer implemented services, and (iii) instantiating the components of the artificial intelligence workflow pipeline components to the allocated components of the distributed system.

The method may end following operation 308.

Turning to FIG. 3B, a second flow diagram illustrating a method for managing operation of a managed system in accordance with an embodiment is shown. The method may be performed by any of the components of the system of FIG. 1.

At operation 320, queue lengths associated with components of an artificial intelligence workflow pipeline that provides undesired computer implemented services is identified. The artificial intelligence workflow pipeline may be hosted by a distributed system. The queue lengths may be for queues that queue service requests for components of the artificial intelligence workflow pipeline. The queue lengths may be obtained by reading them from storage, receiving them from another device, generating them (e.g., based on received telemetry data for the artificial intelligence workflow pipeline), and/or via other methods.

At operation 322, the queue lengths may be filtered using a knowledge base to identify a portion of the components as suspect components. The queue lengths may be filtered by comparing the queue lengths to typical queue lengths indicated by the knowledge base for similar artificial intelligence workflow pipelines. If the queue lengths exceed (or are otherwise anomalous with respect to) the typical queue lengths, then the components to the queues having the queue lengths that exceeded the typical queue lengths may be added to the suspect components.

At operation 324, root causes corresponding to the queue lengths are identified using, at least, information regarding communication capabilities of the suspect components with respect to other components (e.g., of the artificial intelligence workflow pipeline). The root causes may be identified, for each suspect component, by (i) identifying host hardware components, (ii) identifying relationships between the component and other components, (iii) identifying other hardware components hosting the other components, (iv) identifying communication capabilities between the hardware component and the other hardware components, and (v) identifying any data access limits (e.g., read/write issues) for the other hardware components. The communication capabilities and data access limits may be analyzed to identify whether they are impacting the ability of the other components to cooperate with the component thereby causing the corresponding one of the queue lengths for the respective suspect component to be of a length that is atypical for the suspect component.

At operation 326, a remediation plan may be identified based on the root causes. The remediation plan may be identified, as discussed above, using an optimization process to evaluate potential remediations for each of the identified root causes. The objective function may be used to select one of the potential remediation for each of the identified root causes. The selected potential remediations may be aggregated as the remediation plan.

For example, as discussed above, the remediation plan may include migrating query systems (e.g., executing portions of retrieval augmented generation components), data sources (e.g., used by the retrieval augmented generation components, may serve as source of truth data sources for contextual information for prompts), etc. Likewise, the remediation plan may include replicating data sources. Further, the remediation plan may include migrating inferencing components such as trained machine learning models or prompt pre-processors. Migrating/replicating may be within a data processing system, or between data processing systems. The remediation plan may also include adding new hardware components (e.g., which may serve as migration/replication targets for existing components).

The specific selection included in the remediation plan may be guided by criteria that prioritizes different aspects of operation of the distributed system such as, for example, performance (e.g., time to completion), operating cost, reliability, etc. Thus, the use of an optimization process in selecting the actions to be performed in the remediation plan may enable customization of the remediation plan for a broad variety of use cases.

At operation 328, the remediation plan may be performed to update operation of the artificial intelligence workflow pipeline to facilitate provisioning of desired computer implemented services. In contrast to the undesired computer implemented services, the desired computer implemented services may be more likely to meet goal/expectations of the operator by mitigating communication and/or data access bottlenecks in the distributed system.

The method may end following operation 328.

Thus, using the methods shown in FIGS. 3A-3B, embodiments disclosed herein may facilitate deployment of artificial intelligence workflow pipelines and monitoring of the deployed artificial intelligence workflow pipelines to proactively address bottlenecks that may negatively impact performance of the artificial intelligence workflow pipelines.

Figure 4:
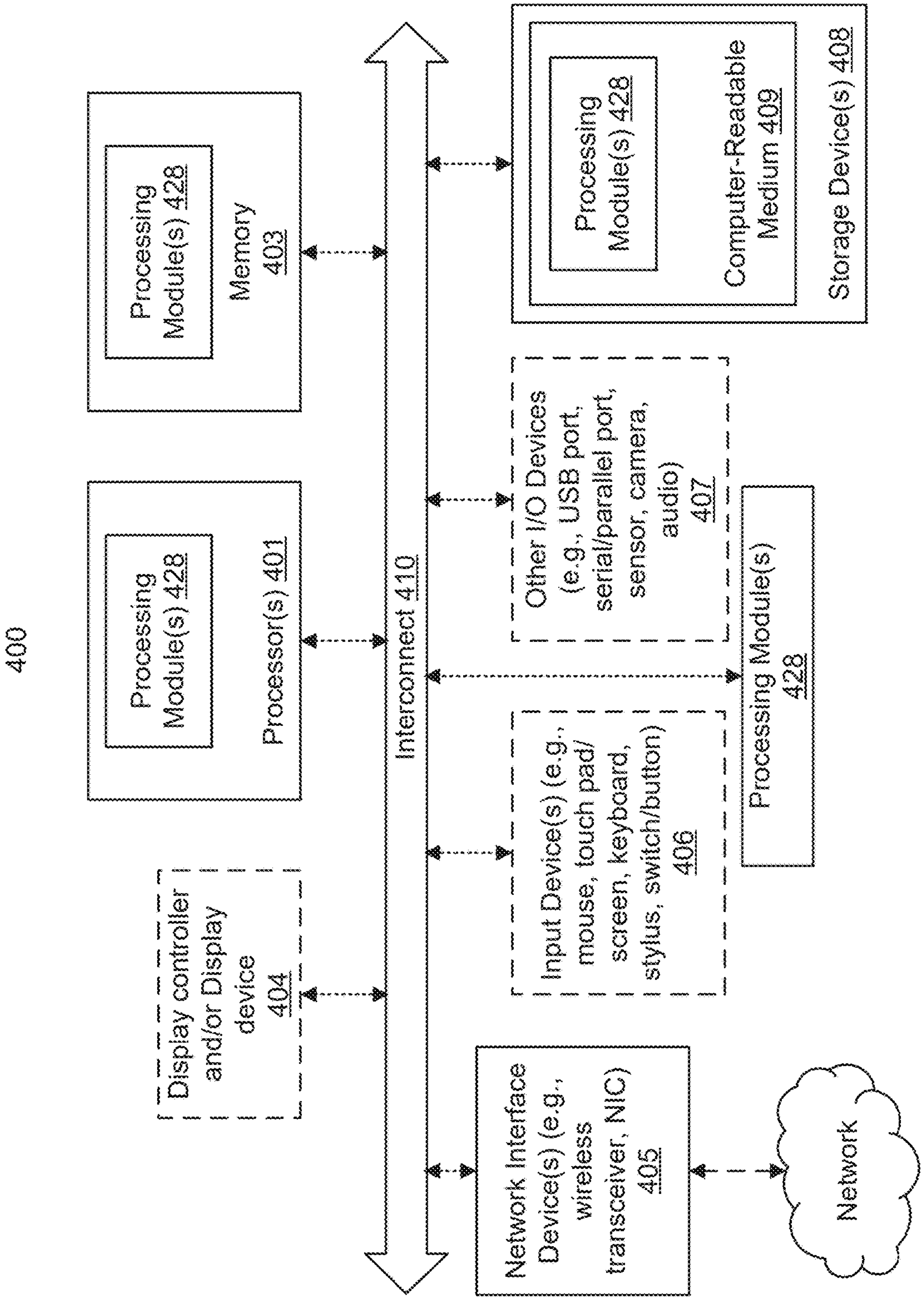
FIG. 4 shows a block diagram illustrating a data processing system in accordance with an embodiment.

Any of the components illustrated in FIGS. 1-2G may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both.

Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a distributed system, the method comprising:

identifying queue lengths associated with components of an artificial intelligence workflow pipeline that provides undesired computer implemented services and is hosted by the distributed system;

filtering the queue lengths using a knowledge base to identify a portion of the components as suspect components;

for a suspect component of the suspect components:

identifying a root cause of a corresponding one of the queue lengths using, at least, information regarding communication capabilities of the suspect component with respect to other components of the components, the root cause being a communication bottleneck between:

a first component of the components of the artificial intelligence workflow pipeline, and one of a second component of the components of the artificial intelligence workflow pipeline or a computing device in communication with the first component;

identifying, based on the root cause, a remediation plan; and performing the remediation plan to update operation of the artificial intelligence workflow pipeline to address the communication bottleneck and facilitate provisioning of desired computer implemented service.

2. The method of claim 1, wherein the components of the artificial intelligence workflow pipeline comprise:

a trained machine learning model;

a prompt pre-processor; and a response processor.

3. The method of claim 2, wherein when the communication bottleneck is between a query system of the prompt pre-processor and a data source used by the query system, the remediation plan comprises at least one action selected from a list of actions consisting of:

migrating the query system;

migrating the data source; and replicating a new copy of the data source.

4. The method of claim 2, wherein when the communication bottleneck is between a source of training data used to train the trained machine learning model and the trained machine learning model, the remediation plan comprises at least one action selected from a list of actions consisting of:

migrating the trained machine learning model; and migrating the source of training data.

5. The method of claim 2, wherein when the communication bottleneck is between the prompt pre-processor and the trained machine learning model, the remediation plan comprises at least one action selected from a list of actions consisting of:

migrating the trained machine learning model; and migrating the prompt pre-processor.

6. The method of claim 2, wherein when the communication bottleneck is between the response processor and a source of truth data source used by the response processor, the remediation plan comprises at least one action selected from a list of actions consisting of:

migrating the response processor; and migrating the source of truth data source.

7. The method of claim 1, wherein the remediation plan comprises at least one action selected from a list of actions consisting of:

migrating at least one component of the artificial intelligence workflow pipeline between host hardware components of the distributed system; and adding new hardware components to the distributed system and migrating the at least one component of the artificial intelligence workflow pipeline from one of the host hardware components to one of the new hardware components.

8. The method of claim 1, wherein filtering the queue lengths comprises:

for a queue associated with one of the queue lengths:

identifying a historic processing rate of a component of the components that uses the queue;

identifying rate at which requests for processing are enqueued in the queue; and determining whether the one of the queue lengths is unexpected based on the historic processing rate and the rate at which the requests for processing are enqueued in the queue; and in an instance of the determining where the one of the queue lengths is unexpected: adding the component of the components to the portion of the components.

9. The method of claim 1, wherein the artificial intelligence workflow pipeline comprises a trained generative machine learning model that is hosted by at least one special purpose hardware device, and a retrieval augmented generation component hosted by a processor that uses a data source stored in a storage device.

10. The method of claim 1, wherein the suspect components are operating in a manner that is not commensurate with computing resources available for use by the suspect components.

11. A non-transitory machine-readable medium having instructions stored therein, which when executed by a processor, cause operations for managing a distributed system to be performed, the operations comprising:

identifying queue lengths associated with components of an artificial intelligence workflow pipeline that provides undesired computer implemented services and is hosted by the distributed system;

filtering the queue lengths using a knowledge base to identify a portion of the components as suspect components;

for a suspect component of the suspect components:

identifying a root cause of a corresponding one of the queue lengths using, at least, information regarding communication capabilities of the suspect component with respect to other components of the components, the root cause being a communication bottleneck between:

a first component of the components of the artificial intelligence workflow pipeline, and one of a second component of the components of the artificial intelligence workflow pipeline or a computing device in communication with the first component;

identifying, based on the root cause, a remediation plan; and performing the remediation plan to update operation of the artificial intelligence workflow pipeline to address the communication bottleneck and facilitate provisioning of desired computer implemented service.

12. The non-transitory machine-readable medium of claim 11, wherein the components of the artificial intelligence workflow pipeline comprise:

a trained machine learning model;

a prompt pre-processor; and a response processor.

13. The non-transitory machine-readable medium of claim 12, wherein when the communication bottleneck is between a query system of the prompt pre-processor and a data source used by the query system, the remediation plan comprises at least one action selected from a list of actions consisting of:

migrating the query system;
migrating the data source; and
replicating a new copy of the data source.

14. The non-transitory machine-readable medium of claim 12, wherein when the communication bottleneck is between a source of training data used to train the trained machine learning model and the trained machine learning model, the remediation plan comprises at least one action selected from a list of actions consisting of:

migrating the trained machine learning model; and
migrating the source of training data.

15. The non-transitory machine-readable medium of claim 12, wherein when the communication bottleneck is between the prompt pre-processor and the trained machine learning model, the remediation plan comprises at least one action selected from a list of actions consisting of:

migrating the trained machine learning model; and
migrating the prompt pre-processor.

16. A data processing system, comprising:

a processor; and
a memory coupled to the processor to store instructions, which when executed by the processor, cause operations for managing a distributed system to be performed, the operations comprising:
identifying queue lengths associated with components of an artificial intelligence workflow pipeline that provides undesired computer implemented services and is hosted by the distributed system;
filtering the queue lengths using a knowledge base to identify a portion of the components as suspect components;
for a suspect component of the suspect components:
identifying a root cause of a corresponding one of the queue lengths using, at least, information regarding communication capabilities of the suspect component with respect to other components of the components, the root cause being a communication bottleneck between:
a first component of the components of the artificial intelligence workflow pipeline, and
one of a second component of the components of the artificial intelligence workflow pipeline or a computing device in communication with the first component;
identifying, based on the root cause, a remediation plan; and
performing the remediation plan to update operation of the artificial intelligence workflow pipeline to address the communication bottleneck and facilitate provisioning of desired computer implemented service.

17. The data processing system of claim 16, wherein the components of the artificial intelligence workflow pipeline comprise:

a trained machine learning model;
a prompt pre-processor; and
a response processor.

18. The data processing system of claim 17, wherein when the communication bottleneck is between a query system of the prompt pre-processor and a data source used by the query system, the remediation plan comprises at least one action selected from a list of actions consisting of:

migrating the query system;
migrating the data source; and
replicating a new copy of the data source.

19. The data processing system of claim 17, wherein when the communication bottleneck is between a source of training data used to train the trained machine learning model and the trained machine learning model, the remediation plan comprises at least one action selected from a list of actions consisting of:

migrating the trained machine learning model; and
migrating the source of training data.

20. The data processing system of claim 17, wherein when the communication bottleneck is between the prompt pre-processor and the trained machine learning model, the remediation plan comprises at least one action selected from a list of actions consisting of:

migrating the trained machine learning model; and
migrating the prompt pre-processor.

* * * * *